(12) United States Patent
Wang et al.

(10) Patent No.: US 8,127,040 B2
(45) Date of Patent: Feb. 28, 2012

(54) SIGNALING BUFFER PARAMETERS INDICATIVE OF RECEIVER BUFFER ARCHITECTURE

(75) Inventors: Ru Shang Wang, Coppell, TX (US); Igor Danilo Diego Curcio, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 882 days.

(21) Appl. No.: 11/342,261

(22) Filed: Jan. 26, 2006

(65) Prior Publication Data

US 2006/0190593 A1 Aug. 24, 2006

Related U.S. Application Data

(60) Provisional application No. 60/649,995, filed on Feb. 3, 2005.

(51) Int. Cl.
*G06F 15/173* (2006.01)
(52) U.S. Cl. ........ 709/234; 709/230; 709/231; 709/232; 709/224
(58) Field of Classification Search ................ 709/231, 709/214, 230, 232, 234, 224; 725/134, 143; 370/389, 351, 395.72
See application file for complete search history.

(56) References Cited

U.S. PATENT DOCUMENTS

| 5,936,881 | A * | 8/1999 | Kawashima et al. | 365/149 |
|---|---|---|---|---|
| 6,345,296 | B1 * | 2/2002 | McCrory et al. | 709/228 |
| 6,366,959 | B1 * | 4/2002 | Sidhu et al. | 709/231 |
| 6,434,606 | B1 * | 8/2002 | Borella et al. | 709/214 |
| 2002/0092030 | A1 * | 7/2002 | Gu | 725/134 |
| 2002/0105951 | A1 * | 8/2002 | Hannuksela et al. | 370/389 |
| 2003/0069963 | A1 | 4/2003 | Jayant et al. | |
| 2004/0057446 | A1 | 3/2004 | Varsa et al. | |
| 2004/0091051 | A1 * | 5/2004 | Youn | 375/240.25 |
| 2004/0161039 | A1 * | 8/2004 | Grundstrom et al. | 375/240.24 |
| 2004/0204945 | A1 * | 10/2004 | Okuda et al. | 704/500 |
| 2004/0255339 | A1 * | 12/2004 | Agnoli et al. | 725/143 |
| 2005/0071876 | A1 * | 3/2005 | van Beek | 725/62 |
| 2006/0109856 | A1 * | 5/2006 | Deshpande | 370/412 |

FOREIGN PATENT DOCUMENTS

| EP | 0515101 A2 | 11/1992 |
|---|---|---|
| EP | 150514 A1 | 8/2004 |
| WO | WO03/069859 | * 8/2003 |

OTHER PUBLICATIONS

Erwu et al. Packet-Late Indication Based (PLIB) Adaptive Jitter Buffer. Proceedings of the winter international symposium on Information and communication technologies. Trinity College, Dublin. Jan. 2004.*
3GPP TS 26.234 (V6.2.0 onwards): "Transparent end-to-end packet switched streaming service (PSS)" Protocols and codecs.
IETF RFC 2326: "Real Time Streaming Protocol (RTSP)", Schulzrinne H., Rao A. and Lanphier R., Apr. 1998.

(Continued)

*Primary Examiner* — Wing Chan
*Assistant Examiner* — Kostas Katsikis

(57) ABSTRACT

The specification and drawings present a new method, system, apparatus and software product for signaling parameters of multiple buffers by a terminal to a server and determining multiple buffer status of the terminal by the server using these parameters, e.g., for an adequate rate adaptation of multimedia streaming services provided to the terminal by the server. The terminal can be (but is not limited to) a computer, a communication device, a wireless communication device, a portable electronic device, a mobile electronic device, a mobile phone, etc.

24 Claims, 5 Drawing Sheets

OTHER PUBLICATIONS

S. Wenger, M.M. Hannuksela, T. Stockhammer, M. Westerlund, and D. Singer, "RTP payload format for H.264 video," http://www.ief.org/internet-drafts/draft-ietf-avt-rtp-h264-11.txt, Aug. 22, 2004.

3GPP2 TS C.P0046 (v.0.1.7 onwards): "3G Multimedia Streaming Services".

IETF RFC 3550: "RTP: A Transport Protocol for Real-Time applications", Jul. 2003.

Miller, Keith, 3rd Generation Partnership Project 2, "3G Multimedia Streaming Services," 3GPP2 C.P0046, version 0.1.8, XP-002650116, Dec. 10, 2004 (50 pages).

3rd Generation Partnership Project, "Technical Specification Group Services and System Aspects; Transparent end-to-end Packet-switched Streaming Service (PSS); Protocols and codecs" (Release 6), 3GPP TS 26.234 V6.2.0, Dec. 1, 2004, Sophia-Antipolis Cedex, France, pp. 29-31, 41-42, 48-50, 97-99.

Curcio, Igor D. D. and Leon, David, "Application Rate Adaptation for Mobile Streaming," Proceedings of the 6th IEEE International Symposium on a World of Wireless Mobile and Multimedia Networks, Jun. 13-16, 2005 (6 pages).

\* cited by examiner

SIGNALING BUFFER PARAMETERS INDICATIVE OF RECEIVER BUFFER ARCHITECTURE

PRIORITY AND CROSS-REFERENCE TO RELATED APPLICATION

This application claims priority from U.S. Provisional Patent Application Ser. No. 60/649,995 filed on Feb. 3, 2005.

FIELD OF THE INVENTION

This invention relates to multimedia communications and more specifically to signaling buffer parameters indicative of receiver buffer status.

BACKGROUND ART

During the DLNA (Digital Living Network Alliance) RTP-TF (Real Time Protocol-Task Force) F2F (Face to Face) meeting on Jan. 26, 2005, problems were identified when discussing the schemes for bit rate adaptation. The conclusion was that different receiver buffer models might need to be considered in order for the receiver buffer feedback to be meaningful for the sender, and to enable the sender to perform an efficient adaptation.

The prior art on this topic is given, for example, in regard to the rate adaptation scheme specified for streaming in 3GPP (3d Generation Partnership Project) and 3GPP2 (3d Generation Partnership Project 2) specifications as described in Technical Specification 26.234 v.6.2.0 "Transparent End-to-end Packet Switched Streaming Service (PSS) Protocols and Codecs", and in Technical Specification C.P0046 v.0.1.7, "3G Multimedia Streaming Services".

The current buffer model defined in 3GPP/3GPP2 is a single buffer, and it contains an RTP (real time protocol) header and a payload. In order to support different buffer models, (e.g., containing more than one buffer) the current prior art signaling schemes are not sufficient to guarantee a workable and efficient solution, e.g., for the adequate rate adaptation.

FIGS. 1-3 show various buffer architectures which can be employed, according to the prior art.

DISCLOSURE OF THE INVENTION

A new method, system, apparatus and software product are presented for signaling parameters for multiple buffers by a terminal to a server and determining multiple buffer status of the terminal by the server using these parameters, e.g., for an adequate rate adaptation of multimedia streaming services provided to the terminal by the server.

According to a first aspect of the invention, a method for signaling buffer parameters, comprises the steps of: sending one or more buffer parameters from a terminal to a server, wherein the one or more buffer parameters relates to at least two buffers of N terminal buffers, and N is an integer of at least a value of two; receiving the buffer parameters from the terminal to the server; and determining a status of the at least two buffers by the server using the buffer parameters.

According further to the first aspect of the invention, the buffer parameters may comprise at least one of: a) a number of the at least two buffers; b) buffer sizes of the at least two buffers; c) buffer size units of the at least two buffers; d) a partial header size in the at least two buffers; e) and a buffer transfer mechanism index, for indicating a transfer mechanism between the at least two buffers. Further, the buffer parameters may further comprise a playout delay unit, for modifying a timing unit.

Further according to the first aspect of the invention, the buffer parameters may comprise: a video pre-decoder buffer indicator; and a video post-decoder buffer indicator.

Still further according to the first aspect of the invention, the at least two buffers may be out of: a) a de-jitter buffer; b) a pre-decoder buffer; and c) a post-decoder buffer.

According further to the first aspect of the invention, the one or more buffer parameters relates to all of the N terminal buffers.

According to a second aspect of the invention, a computer program product comprises: a computer readable storage structure embodying computer program code thereon for execution by a computer processor with the computer program code characterized in that it includes instructions for performing the steps of the first aspect of the invention, indicated as being performed by any component or a combination of components of the terminal or the server.

According to a third aspect of the invention, a communication system, comprises of: a terminal, for providing and sending one or more buffer parameters, wherein the one or more buffer parameters relates to at least two buffers of N terminal buffers of the terminal, wherein N is an integer of at least a value of two; and a server, for receiving the buffer parameters from the terminal and for determining a status of the at least two buffers using the buffer parameters.

According further to the third aspect of the invention, the buffer parameters may comprise at least one of: a) a number of the at least two buffers; b) buffer sizes of the at least two buffers; c) buffer size units of the at least two buffers; d) a partial header size in the at least two buffers; and e) a buffer transfer mechanism index, for indicating a transfer mechanism between the at least two buffers. Further, the buffer parameters may further comprise a playout delay unit, for modifying a timing unit.

According further to the third aspect of the invention, the buffer parameters may comprise: a video pre-decoder buffer indicator; and a video post-decoder buffer indicator.

Further according to the third aspect of the invention, at least two buffers may be out of: a) a de-jitter buffer; b) a pre-decoder buffer; and c) a post-decoder buffer.

Still further according to the third aspect of the invention, the at least two buffers may comprise all N terminal buffers.

According to a fourth aspect of the invention, a terminal, comprises: N terminal buffers, wherein N is an integer of at least a value of two; a terminal control block for providing buffer parameters related to at least two buffers of the N terminal buffers; and input/output terminal block, for sending the buffer parameters from the terminal to a server, for determining a status of the at least two buffers by the server using the buffer parameters.

According further to the fourth aspect of the invention, the terminal may be a computer, a communication device, a wireless communication device, a portable electronic device, a mobile electronic device or a mobile phone.

Further according to the fourth aspect of the invention, the terminal control block and the input/output terminal block may be combined.

According to a fifth aspect of the invention, a server, comprises: an input/output block for receiving one or more buffer parameters from a terminal, wherein the one or more buffer parameters relates to at least two buffers of N terminal buffers of the terminal, wherein N is an integer of at least a value of two; and a server control block for determining a status of the at least two buffers using the buffer parameters.

According further to the fifth aspect of the invention, the server control block may adapt a transmission rate according to the status and using a predetermined criterion, and wherein the input/output block sends media content from the server to the terminal using the adapted transmission rate.

Advantages of the invention include but are not limited to the following:

The receiver uses the signaling to inform the buffer parameters to the sender, so the sender can better understand the receiver buffer status; and The signaling allows the buffer feedback information to be scalable.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
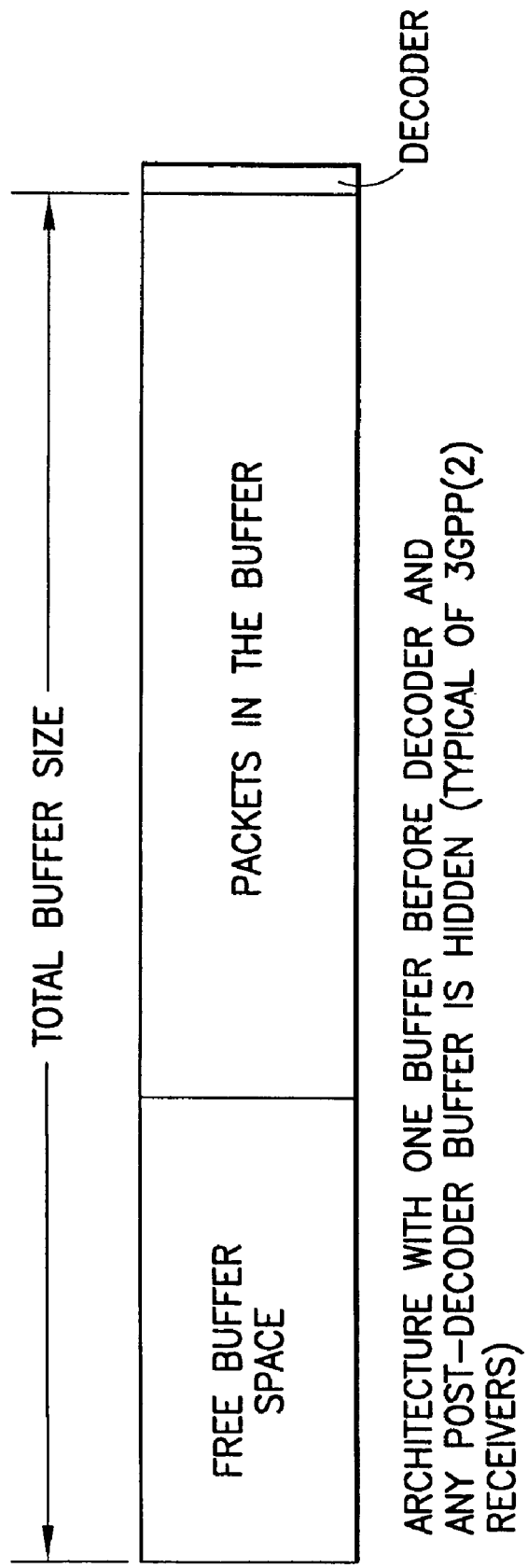
FIGS. 1-3 are schematic diagrams showing various possible receiver buffer architectures, according to the prior art.
Figure 2:
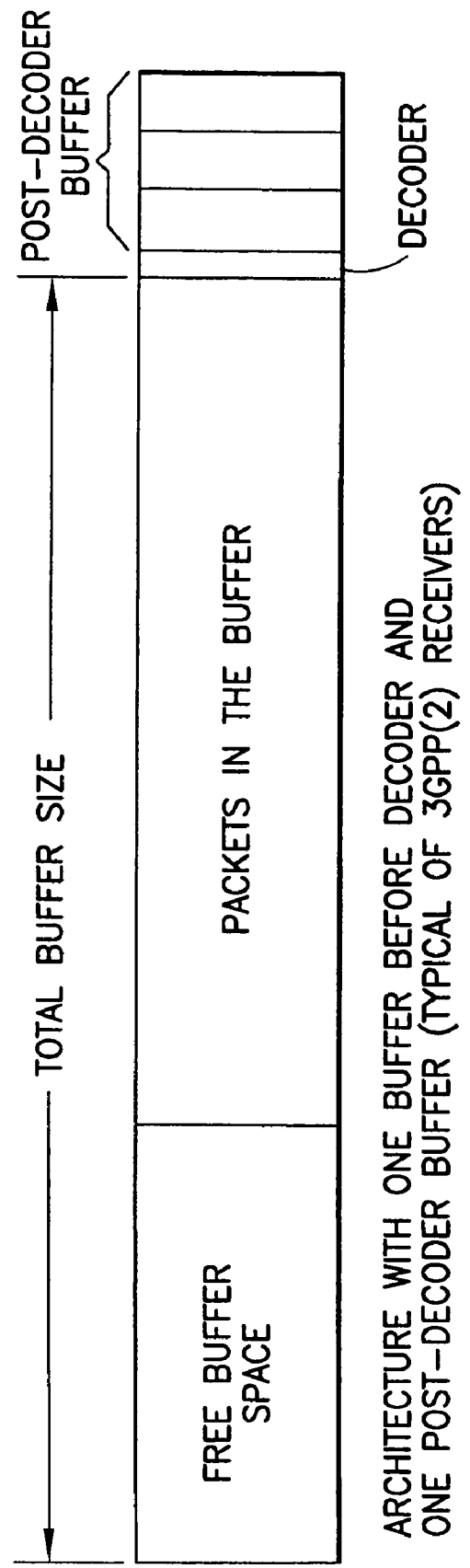
Figure 3:
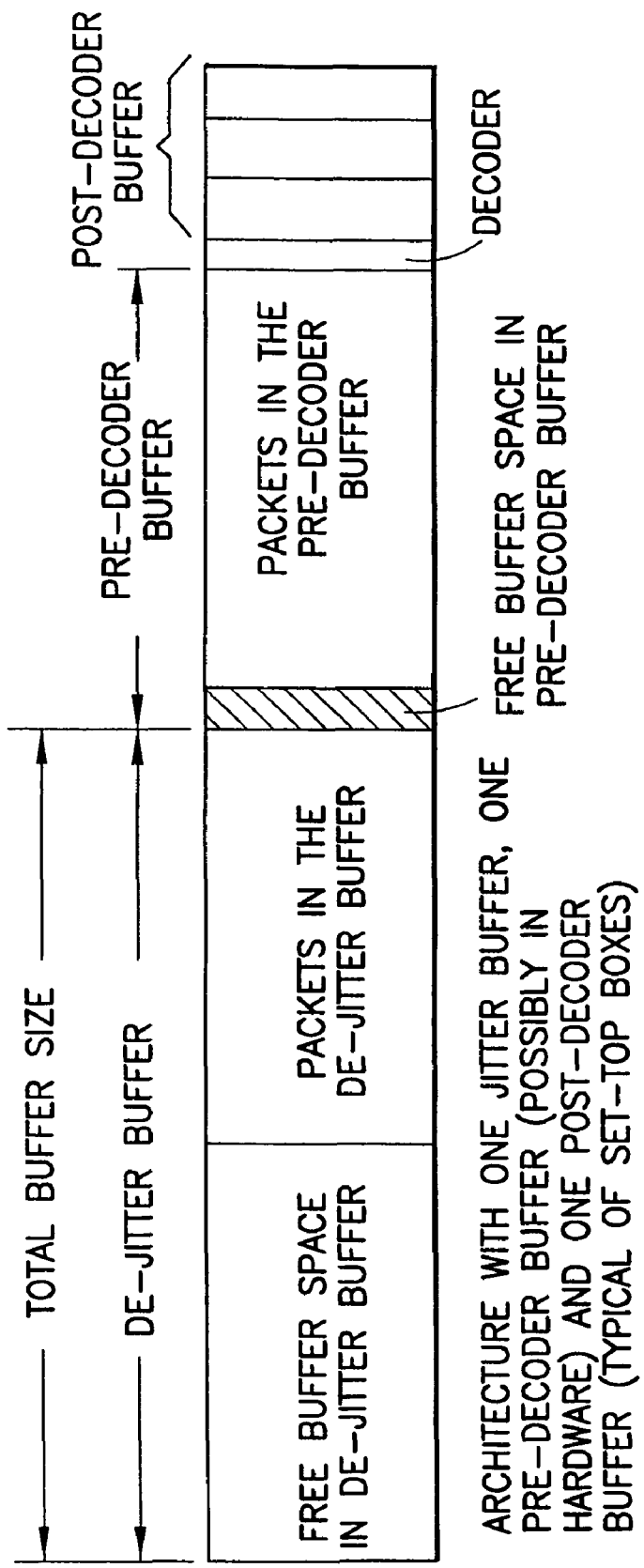

A new method, system, apparatus and software product are presented for signaling parameters of multiple buffers by a terminal to a server and determining multiple buffer status of the terminal by the server using these parameters, e.g., for an adequate rate adaptation of multimedia streaming services provided to the terminal by the server. The terminal can be (but is not limited to) a computer, a communication device, a wireless communication device, a portable electronic device, a mobile electronic device, a mobile phone, etc.

According to an embodiment of the present invention, when a multimedia streaming receiver (e.g., a DMP client, as defined in DLNA) is connected to the sender (e.g., a DMS (DEKSI Modem Pooling) server as defined in the DLNA), the receiver sends at least one of the following buffer parameters (or the multiple buffer parameters) indicative of, but not limited to, a number of buffers (e.g., a jitter buffer, a pre-decoder buffer, a post-decoder buffer, etc.), buffer sizes, buffer size units, a partial header size (e.g., part of the RTP header, see IETF RFC 3550, "RTP: A Transport Protocol for Real-time applications," July 2003), and the transfer mechanism between the two buffers. Moreover, according to a further embodiment of the present invention, the receiver also sends the time unit for the playout delay as defined in Technical Specification 26.234 v.6.2.0 "Transparent End-to-end Packet Switched Streaming Service (PSS) Protocols and Codecs".

The current buffer model defined in 3GPP/3GPP2 is a single buffer, and it contains an RTP (real time protocol) header and a payload. If a two-buffer model is used, in which the receiver exposes to the server at least two buffers instead of one (for example, the jitter buffer and the pre-decoder buffer), and the management mechanism of the two buffers is unknown to the sender, then the receiver buffer signaling currently defined in 3GPP and 3GPP2 will be meaningless. By informing the buffer parameters from receiver to the sender according to embodiments of the present invention, the sender can deduct the correct receiver's buffer status, e.g., for the proper rate adaptation.

According to an embodiment of the present invention, the buffer parameters can, for instance, be defined (but not limited to) as follows:

Number of buffers, i.e., to indicate the number of receiver buffers;

Buffer sizes, i.e., a number of blocks for each of the buffers;

Buffer size units, i.e., the block sizes for the buffers. The current 3GPP FBS (Free Buffer Space) field (e.g., see Technical Specification 26.234 v.6.2.0 "Transparent End-to-end Packet Switched Streaming Service (PSS) Protocols and Codecs") defines a block comprising 64 bytes; this parameter (i.e., the FBS field) can modify the unit indicating that each block indicates any arbitrary number of bytes (for example, a block can be defined in units of 128 bytes);

A partial header size, i.e., the partial RTP (real time protocol) header size in the buffers;

Data transfer mechanism (or buffer transfer mechanism) index: the index indicates what kind of transfer mechanism is used between the buffers;

Playout delay unit, i.e., the playout delay timing unit; the current 3GPP playout delay is defined in ms; this signal is used to modify the timing unit, etc.

According to a further embodiment of the present invention, the signaling can be carried using a protocol out of a plurality of protocols which can be (but are not limited to) RTSP (real time streaming protocol), SDP (session description protocol), XML (extensible markup language), RTCP (real time conferencing protocol), e.g., APP (application) packet or RTP/AVPF (audio visual profile feedback), etc.

Alternatively, according to a further embodiment of the present invention, implicit assumptions on the relations of the buffers can be made and some of the parameters above can therefore be combined. For example, the buffer parameters may include the following binary indicators:

Video pre-decoder buffer indicator:
  a) when the pre-decoder buffer indicator is 1, the receiver contains a video pre-decoder buffer which operates identically to the coded picture buffer (CPB) in the Hypothetical Reference Decoder (HRD) of the video coding standard in use;
  b) when the pre-decoder buffer indicator is 0, a video pre-decoder buffer is not present (i.e., it is combined with de-jittering buffer) or the operation of the pre-decoder buffer is unspecified; and Video post-decoder buffer indicator:
  a) when the post-decoder buffer indicator is 1, the receiver contains a video post-decoder buffer which operates identically to the decoded picture buffer (DPB) in the Hypothetical Reference Decoder (HRD) of the video coding standard in use; if there is no DPB specified in the HRD, then the receiver contains a minimum reordering buffer specified as follows: the minimum reordering buffer is non-existing if the decoding order of pictures is the same as their output order, or the minimum reorder buffer holds one picture if B pictures according to MPEG (Moving Pictures Experts Group) standards such as, e.g., MPEG-2, MPEG-4 Part 2, or according to standards H.263 are present in the received stream;
  b) when the post-decoder buffer indicator is 0, the presence and operation of post-decoder buffer is unspecified.

When these binary indicators are present, then it is assumed that the indicated size of the buffer covers reception, de-jittering, and, if used, de-interleaving buffer(s) and has this given amount of space for complete application data units (ADU), including the following RTP header and RTP payload header fields. Any pre-decoder buffer which cannot be used as a de-jitter, a de-interleaving, or a retransmission buffer is not included in the indicated buffer size. When the binary indicators are equal to 1, then the size of the pre-decoder and/or post-decoder buffers is determined by the video coding profile and level in use.

Below is one illustrating example, according to the embodiments of the present invention, using the RTSP (real time streaming protocol) for two buffers with the following parameters:
  url="rtsp://server.example.com/media.mp4";
  NB=2;
  BF1 ($1^{st}$ buffer size)=5000;
  BSU1 ($1^{st}$ buffer size unit)=1024;
  BF2 ($2^{nd}$ buffer size)=800;
  BSU2 ($2^{nd}$ buffer size unit)=512;
  PHS (partial header size)=12;
  BTM (buffer transfer mechanism)=0; and
  PDU (playout delay unit)=10.

| Buffer # (NB) | Buffer Size (BF, block) | Buffer Unit (BSU, byte) | Partial Header (PHS, byte) |
| --- | --- | --- | --- |
| 1 | 5000 | 1024 | 0 |
| 2 | 800 | 512 | 12 |

The first buffer size is 5000*1024 bytes and the second buffer size is 800*512 bytes. The first buffer contains the full RTP header and payload so the partial header size is not signaled. The second buffer contains 12 bytes of partial headers. The partial RTP header size is important when Interleaved Packetization in H.264 RTP payload (see IETF RFC 3984, "RTP payload format for H.264 video, January 2005) is used.

The buffer size unit can, for example, be expressed by only few bits. If the value is 0, then 64-byte buffer blocks are used. If the value is 1 then 128-byte buffer blocks are used. If the value is 2, then 256-byte buffer blocks are used, and so on.

The buffer transfer mechanism (BTM) can be defined as follows:
  0: when the second buffer has empty space then the first buffer (e.g., the de-jitter) will transfer the data immediately;
  1: the data is transferred according to packet's timestamp.
  2: the data is transferred according to frame rate; for example, video can be 30 fps and audio can be 50 fps;
  3: The data is transferred to the second buffer only when the first buffer is full;
  4: other transfer mechanism than the above.

The above definition of the BTM represents only one example and other BTM definitions using different number of options are also possible.

The playout delay unit (PDU) modifier in the above example is 10x, which means the time unit is now 10 ms. For example, if the playout delay is 200 ms originally, then the new value is 2000 ms. Another example would be just to use one bit. If the bit is 1 the unit is expressed in $\frac{1}{100}^{th}$ of a second. If the bit is 0, then the unit is expressed in milliseconds.

It is noted that, according to an embodiment of the present invention, the multiple buffer parameters can relate to at least two buffers out of N terminal buffers, wherein N is an integer of at least a value of two. Further, the at least two buffers can comprise all N terminal buffers or selected buffers out of the N terminal buffers.

Figure 4:
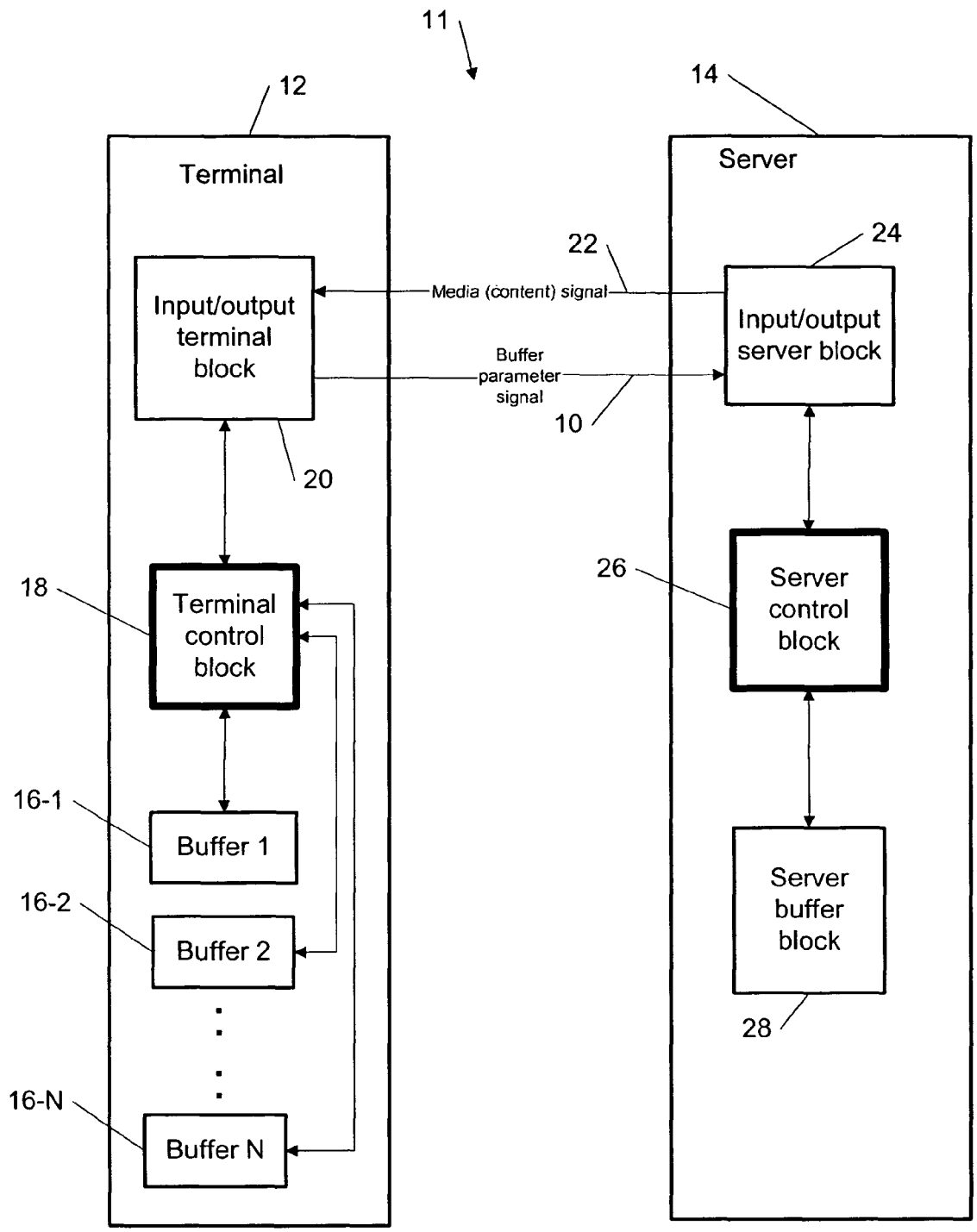
FIG. 4 is a block diagram illustrating signaling buffer parameters indicative of the buffer architecture sent from a receiver (terminal) to a sender (server), according to an embodiment of the present invention.

FIG. 4 shows an example among others of a block diagram illustrating signaling buffer parameters indicative of the buffer architecture sent from a receiver (terminal) 12 to a sender (server) 14 in a communication system 11, according to the embodiment of the present invention. The terminal 12 is called a receiver for purposes of the present invention because it is the recipient of a media (content) signal 22 comprising, e.g., multimedia services from the server 14. The receiver/terminal 12 has N buffers 16-1, 16-2, . . . , 16-N1 connected to a terminal control block 18 which is in turn connected to an input/output terminal block 20. The server can be viewed as having a similar internal structure comprising an input/output server block 24, a server control block 26 and a server buffer block 28, at least for purposes of the present invention, as shown.

The terminal control block 18 in FIG. 4 provides the buffer parameters related to at least two buffers of the N terminal buffers (16-1, 16-2, . . . , 16-N), according to the embodiments of the present invention as described above, to the block 20, which sends the buffer parameters (signal 10) to the corresponding block 24 of the server 14. The buffer information is then forwarded to the server control block 26 of the server 14. The block 26 determines the status of the at least two buffers of the terminal 12 using the received buffer parameters. Based on the status, the server 14 (using the server control block 26) can adapt a transmission rate using a predetermined criterion and send the media content signal 22 using the adopted transmission rate from the server 14 (using the block 24) to the terminal 12.

According to an embodiment of present invention, the blocks 20, 18, 24, 26, 16-1, 16-2, . . . , 16-N and 28 can be implemented as a software, a hardware block or a combination thereof. Furthermore, each of the blocks 20, 18, 24, 26, 16-1, 16-2, . . . , 16-N and 28 can be implemented as a separate block or can be combined with any other standard block of the terminal 12 or the server 14, or it can be split into several blocks according to their functionality.

Figure 5:
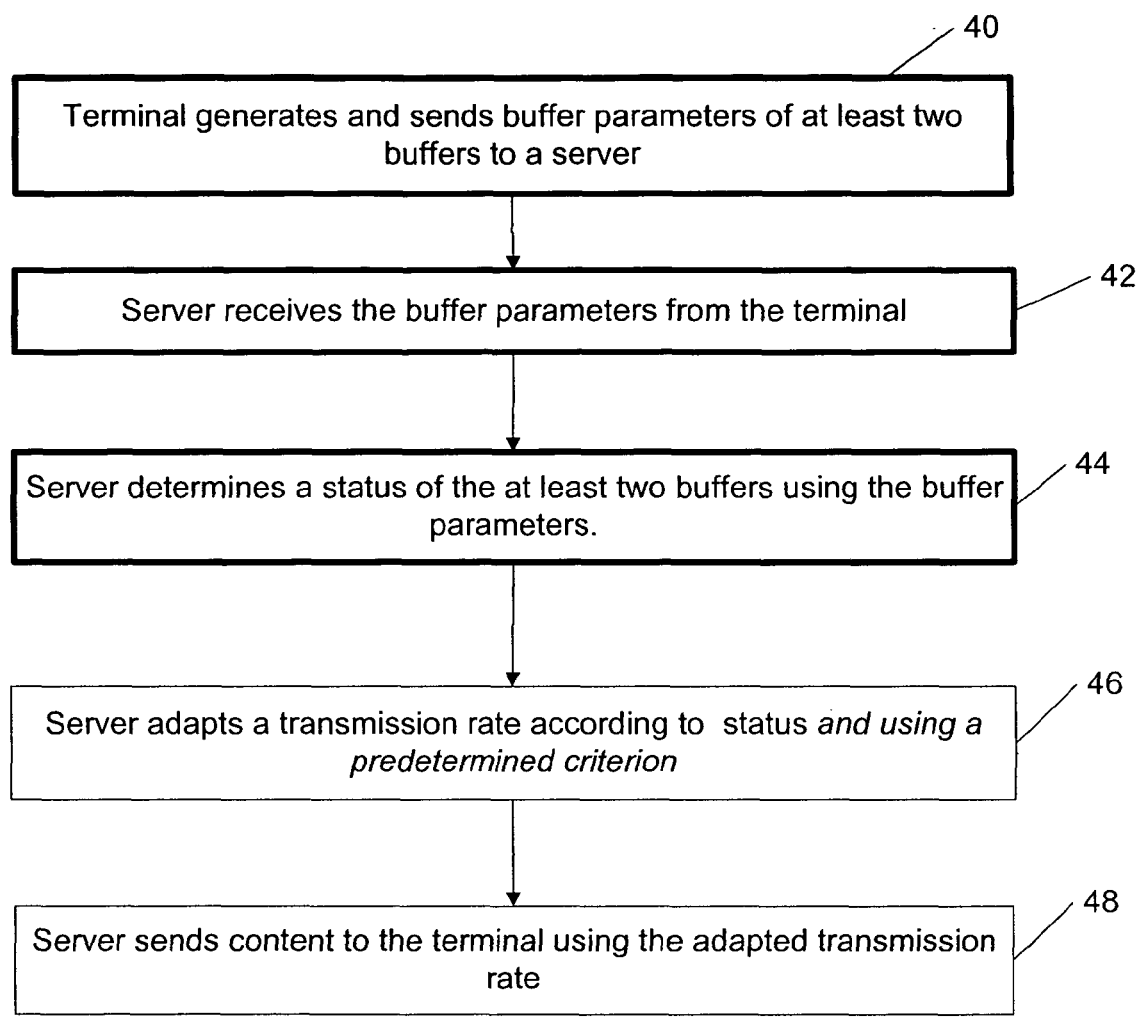
FIG. 5 is a flow chart illustrating signaling buffer parameters indicative of the buffer architecture sent from a receiver (terminal) to a sender (server), according to an embodiment of the present invention.

FIG. 5 shows a flow chart illustrating signaling buffer parameters indicative of the buffer architecture sent from the receiver (terminal) 12 to the sender (server) 14 in a communication system 11, according to an embodiment of the present invention.

The flow chart of FIG. 5 only represents one possible scenario among others. In a method according to the first embodiment of the present invention, in a first step 40, the terminal 12 generates the buffer parameters of the at least two buffers according to the embodiments of the present invention, and sends these parameters (the signal 10) to the server 14. In a next step 42, the server 14 receives the buffer parameters from the terminal 12. In a next step 44, the server 14 determines the status of the at least two buffers using the buffer parameters. In a next step 46, the server 14 adapts a transmission rate according to the status and using the predetermined criterion. Finally, in a next step 48, the server 14 sends the media content (the signal 22) to the terminal 12 using the adapted transmission rate.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for signaling buffer parameters, comprising:
providing, by an apparatus, a signal containing information about one or more buffer parameters related to a communication node,
wherein said one or more buffer parameters relates to two pre-decoding buffers, for determining a status of the two pre-decoding buffers using the one or more buffer parameters,
wherein at least two different buffer transfer mechanisms exist for transferring data between said two pre-decoding buffers, and
wherein the one or more buffer parameters comprises at least a buffer transfer mechanism index, indicating a used transfer mechanism between the two pre-decoding buffers.

2. The method of claim 1, wherein the one or more buffer parameters comprises at least one of:
buffer sizes of the two pre-decoding buffers;
buffer size units of the two pre-decoding buffers; and
a partial header size in the two pre-decoding buffers.

3. The method of claim 2, wherein the one or more buffer parameters further comprises information about a playout delay unit, for modifying a timing unit.

4. The method of claim 1, wherein the two pre-decoding buffers are out of:
a de-jitter buffer; and
a pre-decoder buffer.

5. A computer program product comprising:
a computer readable non-transitory storage structure embodying computer program code thereon for execution by a computer processor with said computer program code, wherein said computer program code comprises instructions for performing:
providing, by an apparatus, a signal containing information about one or more buffer parameters related to a communication node,
wherein said one or more buffer parameters relates to two pre-decoding buffers, for determining a status of the two pre-decoding buffers using the one or more buffer parameters,
wherein at least two different buffer transfer mechanisms exist for transferring data between said two pre-decoding buffers, and
wherein the one or more buffer parameters comprises at least a buffer transfer mechanism index, indicating a used transfer mechanism between the two pre-decoding buffers.

6. A computer program product comprising:
a computer readable non-transitory storage structure embodying computer program code thereon for execution by a computer processor with said computer program code, wherein said computer program code comprises instructions for performing:
receiving, by an apparatus, a signal containing information about one or more buffer parameters related to a communication node,
wherein said one or more buffer parameters relates to two terminal buffers, for determining a status of the two terminal buffers using the one or more buffer parameters,
wherein at least two different buffer transfer mechanisms exist for transferring data between said two terminal buffers, and
wherein the one or more buffer parameters comprises at least a buffer transfer mechanism index, indicating a used transfer mechanism between the two terminal buffers.

7. A method for signaling buffer parameters, comprising:
providing, by an apparatus, a signal containing information about one or more buffer parameters related to a media data buffer in a communication node, wherein said one or more buffer parameters relates to two pre-decoding buffers for media data, for determining a status of the two pre-decoding buffers using the one or more buffer parameters;
wherein at least two different buffer transfer mechanisms exist for transferring the media data between said two pre-decoding buffers, and
wherein the one or more buffer parameters comprises at least a buffer transfer mechanism index, indicating a used transfer mechanism for transferring the media data between the two pre-decoding buffers.

8. A communication system, comprising:
a terminal, configured to provide and send a signal containing information about one or more buffer parameters, wherein said one or more buffer parameters relates to two buffers of said terminal,
a server, configured to receive the signal containing the information about the one or more buffer parameters, for determining a status of the two buffers using the buffer parameters; and
wherein at least two different buffer transfer mechanisms exist for transferring data between said two buffers, and
wherein the buffer parameters comprise at least a buffer transfer mechanism index, indicating a used transfer mechanism between the two buffers.

9. The communication system of claim 8, wherein the one or more buffer parameters comprises at least one of:
buffer sizes of the two buffers;
buffer size units of the two buffers; and
a partial header size in the two buffers.

10. The communication system of claim 9, wherein the one or more buffer parameters further comprises information about a playout delay unit, for modifying a timing unit.

11. The communication system of claim 8, wherein the one or more buffer parameters comprises:
a video pre-decoder buffer indicator; and
a video post-decoder buffer indicator.

12. The communication system of claim 8, wherein the two buffers are out of:
a de-jitter buffer; and
a pre-decoder buffer.

13. The communication system of claim 8, wherein the one or more buffer parameters relate to the two buffers.

14. A terminal, comprising:
N terminal buffers, wherein N is an integer of at least a value of two;
a terminal control block configured to provide one or more buffer parameters related to two terminal buffers; and
an input/output terminal block, configured to send a signal containing information about the one or more buffer parameters from the terminal to be received by a server, for determining a status of the two terminal buffers using the one or more buffer parameters, wherein at least two different buffer transfer mechanisms exist for transferring data between said two terminal buffers, and wherein the one or more buffer parameters comprises at least a buffer transfer mechanism index, indicating a used transfer mechanism between the two terminal buffers.

15. The terminal of claim 14, wherein said terminal is a communication device for wireless communications.

16. The terminal of claim 14, wherein the terminal control block and the input/output terminal block are combined.

17. A server, comprising:
an input/output block configured to receive a signal containing information about one or more buffer parameters related to a terminal, wherein said one or more buffer parameters relates to two terminal buffers; and
a server control block configured to determine a status of the two terminal buffers using the one or more buffer parameters,
wherein at least two different buffer transfer mechanisms exist for transferring data between said two terminal buffers, and
wherein the one or more buffer parameters comprises at least a buffer transfer mechanism index, indicating a used transfer mechanism between the two terminal buffers.

18. The server of claim 17, wherein the server control block is configured to adapt a transmission rate according to said status and using a predetermined criterion, and wherein the input/output block is configured to send media content from the server to be received by the terminal using said adapted transmission rate.

19. A method for signaling buffer parameters, comprising:
receiving, by an apparatus, a signal containing information about one or more buffer parameters related to a communication node,
wherein said one or more buffer parameters relates to two terminal buffers, for determining a status of the two terminal buffers using the one or more buffer parameters,
wherein at least two different buffer transfer mechanisms exist for transferring data between said two terminal buffers, and
wherein the one or more buffer parameters comprises at least a buffer transfer mechanism index, indicating a used transfer mechanism between the two terminal buffers.

20. The method of claim 19, wherein the buffer parameters comprise at least one of:
buffer sizes of the two terminal buffers;
buffer size units of the two terminal buffers; and
a partial header size in the two terminal buffers.

21. The method of claim 20, wherein the one or more buffer parameters further comprise information about a playout delay unit, for modifying a timing unit.

22. The method of claim 19, wherein the one or more buffer parameters comprise:
a video pre-decoder buffer indicator; and
a video post-decoder buffer indicator.

23. The method of claim 19, wherein the two terminal buffers are out of:
a de-jitter buffer; and
a pre-decoder buffer.

24. The method of claim 19, wherein the one or more buffer parameters relate to the two terminal buffers.

* * * * *